(12) United States Patent
François

(10) Patent No.: US 6,820,644 B1
(45) Date of Patent: Nov. 23, 2004

(54) DELIVERY VALVE DEVICE FOR REFRIGERANT FLUID COMPRESSOR

(75) Inventor: Philippe François, Artas (FR)

(73) Assignee: Tecumseh Europe S.A., La Verpilliere (FR)

( * ) Notice: Subject to any disclaimer, the term of this patent is extended or adjusted under 35 U.S.C. 154(b) by 9 days.

(21) Appl. No.: 10/088,507

(22) PCT Filed: Sep. 26, 2000

(86) PCT No.: PCT/FR00/02656

§ 371 (c)(1),
(2), (4) Date: Mar. 28, 2002

(87) PCT Pub. No.: WO01/23760

PCT Pub. Date: Apr. 5, 2001

(30) Foreign Application Priority Data

Sep. 28, 1999 (FR) .............................. 99 12071

(51) Int. Cl.$^7$ ............................ F04B 39/10; F16K 15/16
(52) U.S. Cl. .................... 137/512; 137/512.1; 137/855; 137/857; 417/569
(58) Field of Search .............................. 137/512, 512.1, 137/855, 856, 857; 417/569, 571

(56) References Cited

U.S. PATENT DOCUMENTS

| | | | | |
|---|---|---|---|---|
| 1,707,306 A | * | 4/1929 | Holdsworth | ............. 137/512.1 |
| 2,021,085 A | * | 11/1935 | Orr | ............................. 137/856 |
| 2,161,769 A | * | 6/1939 | Trask | .......................... 137/857 |
| 2,908,287 A | * | 10/1959 | Augustin | ..................... 137/856 |
| 2,970,608 A | * | 2/1961 | Doeg | .................... 137/516.11 |
| 3,751,915 A | * | 8/1973 | Ranft et al. | .................... 60/290 |
| 3,811,468 A | * | 5/1974 | Bellmer | ................. 137/512.15 |
| 4,257,457 A | | 3/1981 | Namura et al. | |
| 4,410,006 A | * | 10/1983 | Moulton | .................. 137/493.8 |
| 4,507,059 A | * | 3/1985 | Kobayashi et al. | ......... 417/270 |
| 4,628,963 A | * | 12/1986 | Ishijima et al. | ............. 137/857 |
| 5,110,272 A | | 5/1992 | Andrione et al. | |
| 5,558,508 A | * | 9/1996 | Sasano et al. | ............... 417/569 |
| 5,887,622 A | * | 3/1999 | Ahn | .......................... 137/856 |
| 6,012,489 A | * | 1/2000 | Rene et al. | ................. 137/856 |

FOREIGN PATENT DOCUMENTS

DE          195 04 267          4/1996

* cited by examiner

Primary Examiner—Ramesh Krishnamurthy
(74) Attorney, Agent, or Firm—Oblon, Spivak, McClelland, Maier & Neustadt, P.C.

(57) ABSTRACT

A delivery valve device for a refrigerant compressor. The delivery valve device include a valve plate with the delivery passage closed by a delivery valve fixed at one end to the valve plate and pressed against this valve plate at its free end by a spring. A valve stop is fixed with the delivery valve and the spring to the valve plate to clamp one end of the delivery valve and of the spring onto the valve plate using rivets. The sliding contact of the free end of the delivery valve on the plate avoids valve bounce and flutter. Such a delivery valve may reduce the noise level in refrigeration compressors.

11 Claims, 4 Drawing Sheets

DELIVERY VALVE DEVICE FOR REFRIGERANT FLUID COMPRESSOR

BACKGROUND OF THE INVENTION

Field of the Invention

The invention relates to a delivery valve device for a refrigerant compressor.

DISCUSSION OF THE BACKGROUND

Refrigerant compressors of various types, for example reciprocating or rotary compressors, are known, particularly hermetically sealed motor-driven compressors for domestic or commercial refrigeration and air conditioning. All these compressors have the function of compressing a refrigerant fluid.

The general principle of such compressors is illustrated in FIG. 1, which schematically depicts, in a cylinder, a piston 19, a valve plate 11 and a cylinder head comprising two chambers 16 and 18. The walls of the cylinder, the piston 19 and the valve plate 11 delimit a compression/expansion chamber 15. The valve plate 11 has an intake passage 110, between the compression/expansion chamber 15 and the intake chamber 16, and a delivery passage 111 between the chamber 15 and the delivery chamber 18. An intake valve 12 is positioned on the valve plate 11 and pressed against it. During the intake phase, the valve 12 opens under the effect of the pressure difference between the compression/expansion chamber 15, which increases in volume because of the retreating movement of the piston (here assumed to be of the reciprocating type), and the intake chamber 16. The movement of the intake valve is limited by a stop 17. At the end of the intake phase, the valve 12 closes again against the valve plate, sealing the passage 110 against fluid when compression begins.

A delivery valve 13 is positioned on the valve plate 11 and pressed against it. It is generally built in at one end and free at the other end. During the delivery Phase, the valve 13 opens under the effect of the pressure difference between the chamber 15, where the fluid is compressed under the effect of the piston 19, and the delivery chamber 18. The movement of the delivery valve 13 is limited by a delivery vave stop 14 against which the valve 13 comes into contact. At the end of the delivery phase, the delivery valve 13 closes again against the valve plate 11, sealing against the reflux of the fluid through the passage 111.

In fact, it is found that the operation of the valves explained herein above is more complicated than that. In particular, the intake and delivery valves generally open several times during a given phase in the cycle and experience a fluttering movement between the valve plate and the stop. This flutter leads to metal-to-metal impact which generates noise and greatly increases the noise level of the compressor, particularly as far as the delivery valve is concerned.

A valve device of this type is described for example in American patent U.S. Pat. No. 5,110,272. Therein can be found all the elements described above. The problem that this device sets out to solve is that of giving the delivery valves sufficient flexibility while at the same time keeping its axial bulk to an acceptable level. This is achieved by providing a L-shaped valve. However, this valve lifts a great way off the valve plate when it opens, and is therefore subject to the flutter described above and to the ensuing disadvantages.

The object of the invention is to appreciably reduce the noise level of the compressor by limiting the impact due to the delivery valve.

SUMMARY OF THE INVENTION

The subject of the invention is therefore a delivery valve device which overcomes the drawbacks described herein above by virtue of a modification to the a principle of the valve on the delivery side which consists in keeping the delivery valve in constant contact, at both ends, with the valve plate.

According to the invention, there is therefore provided a delivery valve device for a refrigerant compressor of the type comprising a valve plate pierced with at least one fluid delivery passage, at least one delivery valve closing said passage on the downstream side in the direction of delivery of the fluid, and secured, at one of its ends, to the valve plate by first fixing the means and at least one delivery valve stop, said device being characterized in that said delivery valve is secured, at one of its ends, to the valve plate by first fixing means and is held at its other end, in almost permanent sliding contact with the valve plate by a spring secured to the valve plate by second fixing means.

By virtue of the fact that the valve stressing spring allows it to slide but not to lift off the valve plate, there is no bounce and flutter of the valve, hence reducing the noise level.

Another important advantage of the device according to the invention is the increase in the refrigeration capacity of the compressor, for the same cylinder capacity, through the limiting of the effects of delayed closure of the delivery valve.

BRIEF DESCRIPTION OF THE DRAWINGS

The invention will be better understood and other features and advantages will become apparent through the description below and the appended drawings in which.

DESCRIPTION OF EMBODIMENTS

Figure 1:
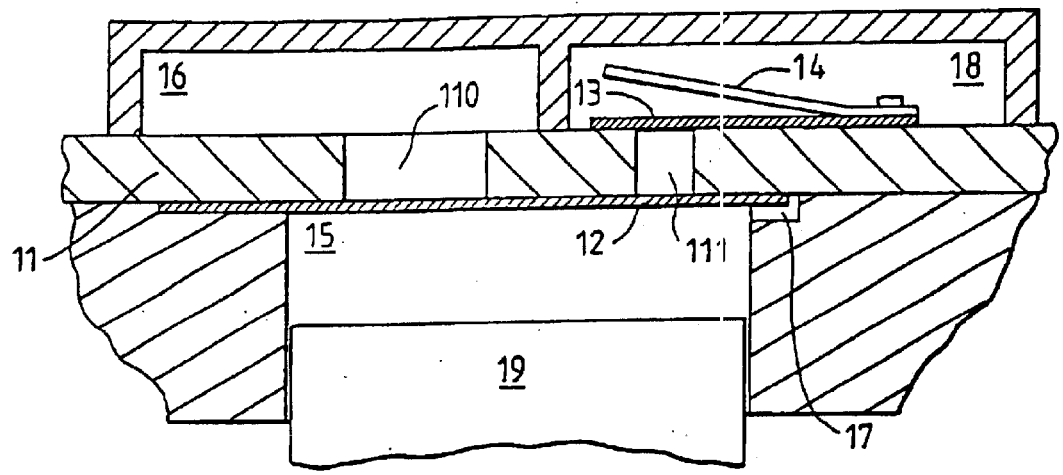
FIG. 1 is an outline diagram of the system of valves of a known compressor.

FIG. 1 has already been described above.

Figure 2:
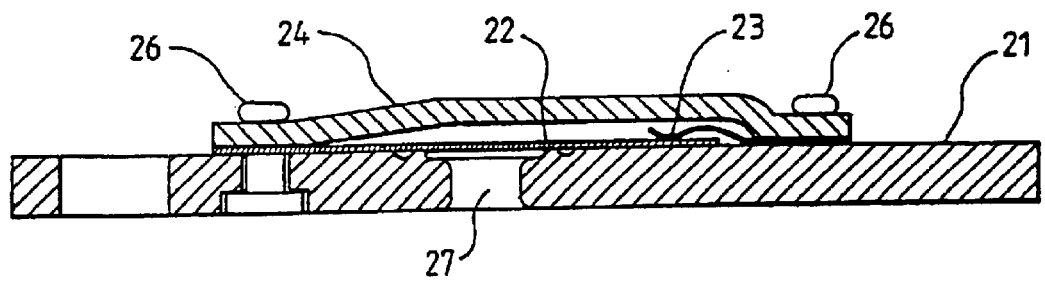
FIG. 2 depicts, in section, the principle of a delivery valve device according to the invention.

FIG. 2 illustrates the principle of the delivery valve device according to the invention. Mounted on the valve plate 21 comprising a delivery passage 27 is a delivery valve 22. This valve is held, at one end, secured to the valve plate via fixing means such as a rivet 26 which also fixes a delivery valve stop 24. The other end of the delivery valve 22 is free but kept in constant and sliding contact with the valve plate 21 by a spring 23, preferably a leaf spring, one end of which is fixed to the valve plate and the other end of the stop 24 by other fixing means such as another rivet 26. Thus, the valve stop 24 also clamps the valve 22 and the spring 23 to the valve plate 21.

In that way, the free end of the valve can slide against the valve plate while being kept in contact with it, during opening deformation of the valve in the compressed-fluid delivery phase. By virtue of this almost permanent contact, the impacts of the valve against the stop or against the valve plate which are due to the intrinsic stiffness of the valve and to the effect of inertia after opening, are reduced considerably.

Figure 3:
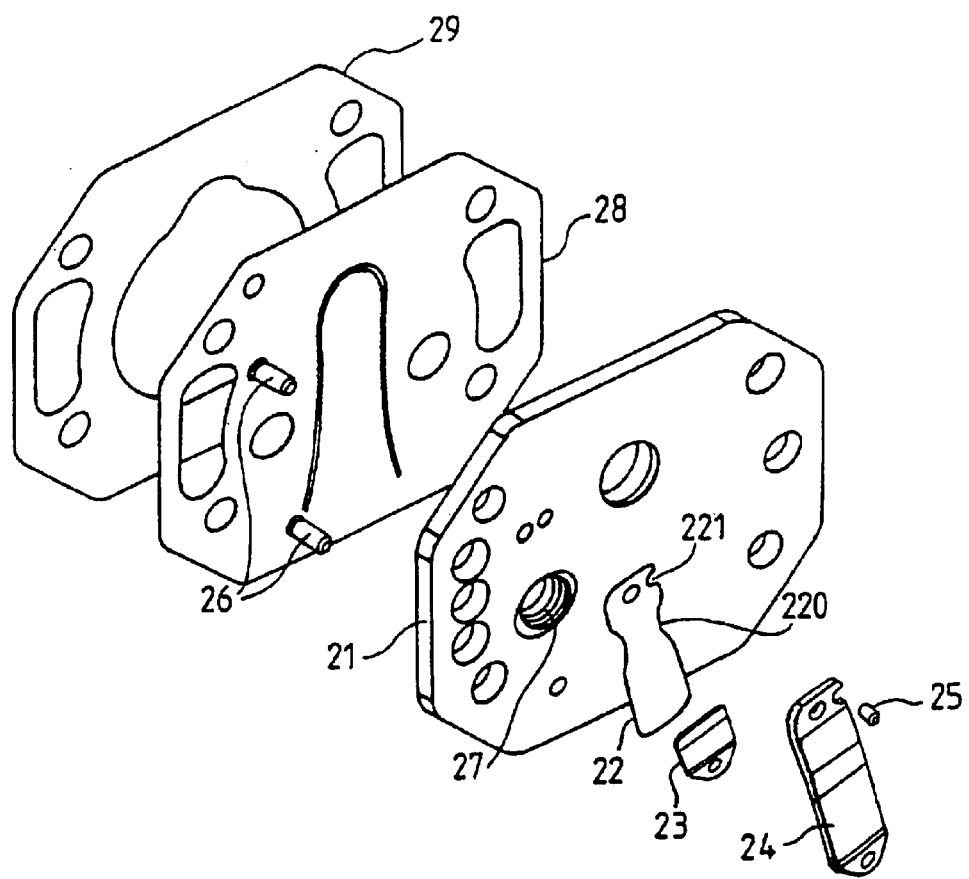
FIG. 3 is one exemplary embodiment of the delivery valve device according to the invention, with just one valve.

FIG. 3 depicts one exemplary embodiment of the device according to the invention. The same reference numerals denote the same elements as in FIG. 2. In FIG. 3, in addition to the valve plate 21, the valve stop 24 and the delivery valve 22, there are also depicted the intake valve 28 and a valve plate gasket 29. Also depicted are the two fixing rivets 26 which are preferred fixing means but which could be replaced by other known means. The delivery valve 22 comprises a reduced-width part 220, of which more later, and a notch 221 to allow the passage of a peg 25 which centers the component and more particularly the valve 22 and prevents them from rotating. If necessary, another peg may be provided for immobilizing the spring 23.

The solution according to the invention thus has the advantages of simplicity, reducing the number of components to a minimum, increasing their robustness (minimum number of drillings in the weakest components) and reducing the cost by not requiring the stop to be machined, which stop is generally a component made of sintered metal.

In certain applications, particularly commercial ones, requiring a high power, therefore a high cylinder capacity and a high fluid flow rate, there are problems of routing this flow rate with the most compact possible compressor equipment. This problem cannot be solved satisfactorily with large-diameter passages in the valve plate because it is then very difficult to house an appropriate valve. One solution therefore consists in providing two smaller passages in the valve plate, for delivery and for intake.

Figure 4:
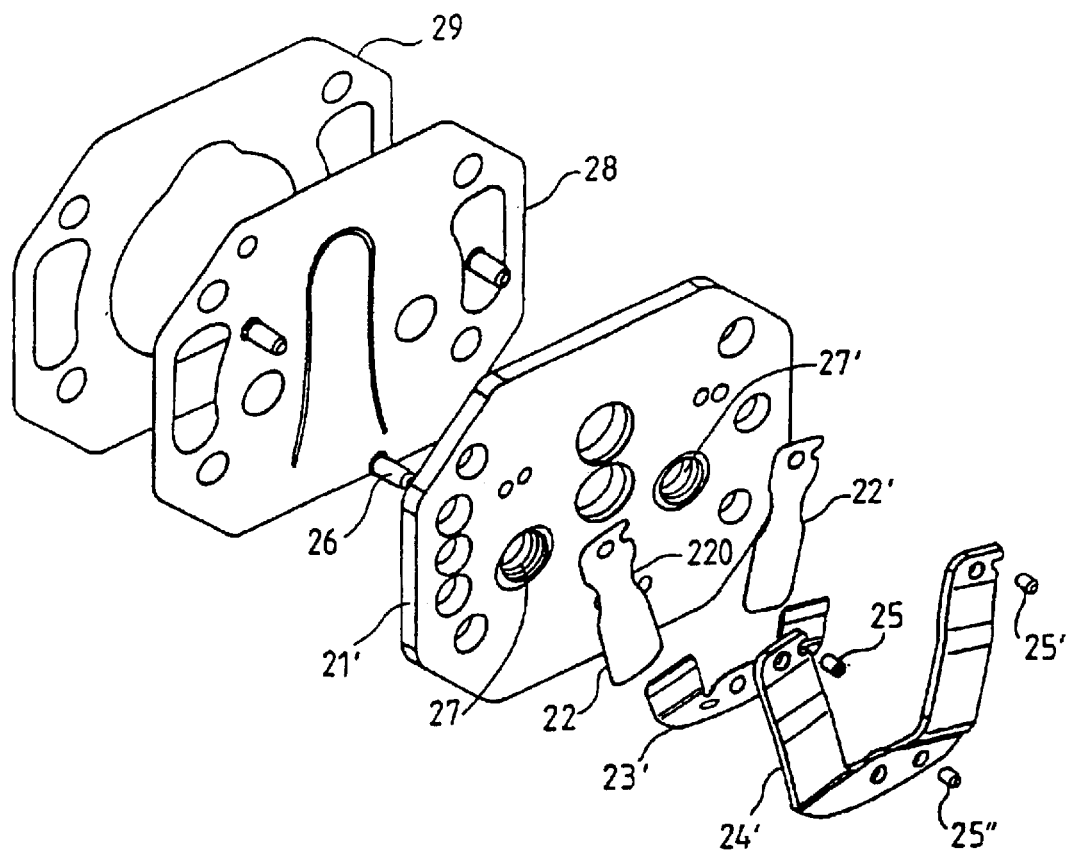
FIGS. 4 and 5 depict two alternative forms of a double valve device according to the invention.

FIG. 4 depicts one embodiment of the delivery valve device according to the invention, suited to this solution. The valve plate 21' comprises two delivery passages 27 and 27', each closed via a delivery valve 22 and 22' respectively. These valves are kept secure to the valve plate at one end. Their free end is kept in sliding contact with a plate 21' by a single U-shaped spring 23', the branches of which press respectively on the free ends of the valves and the central part of which is fixed to the valve plate by a rivet 26 which also serves to fix, in its central part, a single valve stop 24', also U-shaped. The branches of this stop are fixed at their end, together with the non-free end of the valve, by other rivets 26. The way in which each delivery valve works is strictly identical to the mode of operation of the single delivery valve of FIG. 3.

For centering the various components and preventing them from rotating, there are provided, for example, three pegs 25,25' and 25".

The other elements depicted are identical to those of FIG. 3 and bear the same references.

Figure 5:
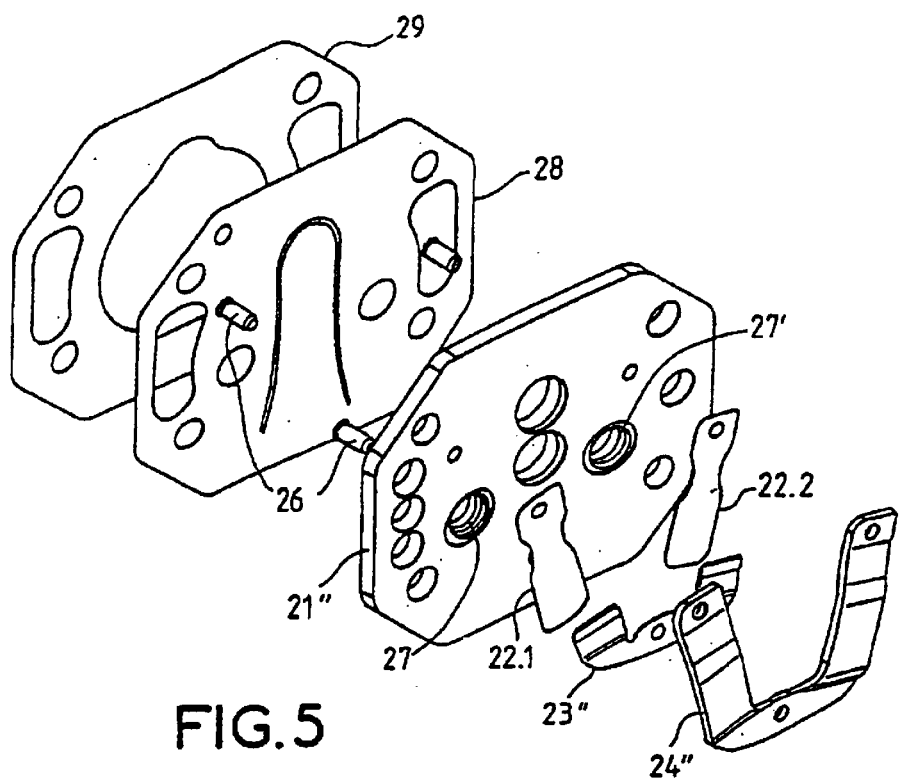

FIG. 5 depicts an alternative form of the device of FIG. 4. The only modification made is the omission of the centering pegs which therefore entails a small modification to the valve plate, 21" instead of 21', the delivery valve 22.1 and 22.2 instead of 22 and 22', the spring and the stop, 23" and 24" instead of 23' and 24'.

To maintain the function of preventing the valves and the spring from rotating, it is merely envisaged for the cylindrical cross section of the holes used for fastening these to be modified so that they are no longer circular, as is usually the case, but preferably a star-shaped cross section (although other shapes would also be possible). The material of the rivets 26 which is displaced by the riveting operation occupies the star- or other-shaped volume inside the valves and the spring, thus preventing them from rotating.

It is obvious that this solution can also be adopted in the case of the exemplary embodiment with just one valve in FIG. 3.

It is now necessary to return to the shape of the delivery valves, namely the use of a part of reduced width 220.

For the high fluid pressures that may be used, (when the pressure in the delivery chamber becomes very much higher than the pressure in the compression/expansion chamber) an effect of the valve being extruded through the delivery passage, somewhat like stamping in reverse, may occur when the delivery valve is in the closed position. To avoid detrimental consequences, the thickness of the valve leaf needs therefore to be increased, and this results in greater stiffness. To compensate for that, provision is therefore made for the width of the valve to be reduced in a region of lower stress.

Figure 6:
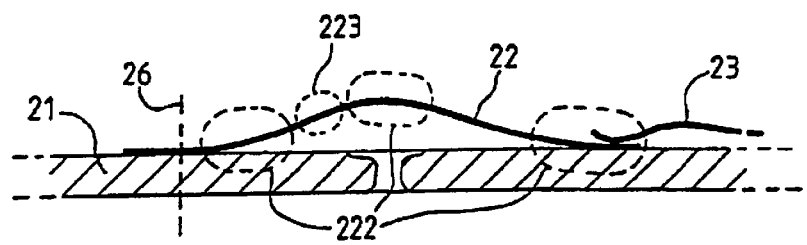
FIG. 6 is a diagram illustrating another feature of the delivery valve.

FIG. 6 illustrates the principle of this feature. This figure schematically depicts the valve plate 21, the valve 22 in the open position fixed by the rivet 26 and the spring 23. It can be seen that in the open position, because of the deformation of the valve, maximum stresses are applied approximately to the zones 222 delimited by the dashes. By contrast, in a zone such as 223, delimited approximately by dotted lines, the stresses are at a minimum and the width reduction 220 can therefore be applied there.

Of course the exemplary embodiments described do not in any way limit the invention. This invention applies irrespective of the type of compressor and irrespective of the type of refrigerant used.

What is claimed is:

1. A delivery valve device for a refrigerant compressor comprising:

a valve plate pierced with at least one fluid delivery passage;

at least one delivery valve closing said at least one fluid delivery passage on a downstream side in a direction of delivery of the fluid, and secured, at one of its ends, to the valve plate by first fixing means; and at least one delivery valve stop, wherein said at least one delivery valve is clamped at its other end, in almost permanent sliding contact with the valve plate by a spring, said spring being secured to the valve plate by second fixing means and directly contacting the valve plate.

2. The delivery valve device as claimed in claim 1, wherein said spring includes an elastic leaf fixed at one end to the valve plate by said second fixing means and pressing, toward its other end, the at least one delivery valve onto the valve plate.

3. The delivery valve device as claimed in claim 2, wherein said first and second fixing means at a same time fix said at least one delivery valve stop to the valve plate so that the at least one delivery valve stop clamps the at least one delivery valve and the spring onto the valve plate at the first and second fixing means.

4. The delivery valve device as claimed in claim 1, wherein said first and second fixing means include rivets.

5. The delivery valve device as claimed in claim 1, further comprising pegs fixed into the valve plate to prevent the at least one delivery valve and said spring from rotating.

6. A delivery valve device for a refrigerant compressor comprising:

a valve plate pierced with two fluid delivery passages;

two delivery valves closing said two fluid delivery passages on a downstream side in a direction of delivery of the fluid, and secured, at a respective end thereof, to the valve plate by first fixing means; and at least one delivery valve stop said at least one delivery valve stop being a single stop for the two delivery valves, wherein said two delivery valves are clamped at a respective other end thereof, in almost permanent sliding contact with the valve plate by a spring, said spring being a single spring for the two delivery valves and being secured to the valve plate by second fixing means.

7. The delivery valve device as claimed in claim 6, wherein said spring is in a shape of a U with branches that respectively press free ends of the two delivery valves against the valve plate and a central part of which is fixed to the valve plate by said second fixing means, and said at least one delivery valve stop is in a shape of a U with branches acting as respective stops for the two delivery valves and ends of which are fixed to the valve plate by said first fixing means and a central part of which is fixed to the valve plate by said second fixing means.

8. The delivery valve device as claimed in claim 1, wherein said fixing means, said at least one delivery valve and said spring are configured to, at a same time, prevent the at least one delivery valve and the spring from rotating.

9. The delivery valve device as claimed in claim 8, wherein the fixing means includes rivets collaborating with fixing orifices in said at least one delivery valve and the spring, the fixing orifices having a cross-section of a non-circular shape.

10. The delivery valve device as claimed in claim 9, wherein said shape of the cross-section of the fixing orifices is star shaped.

11. The delivery valve device as claimed in claim 1, wherein said at least one delivery valve has a part of reduced width in a region of lesser stress to adapt to a stiffness of said at least one delivery valve.

* * * * *